US010779365B2

(12) United States Patent
Millett

(10) Patent No.: US 10,779,365 B2
(45) **Date of Patent: *Sep. 15, 2020**

(54) MICROWAVE OVEN HAVING DOOR WITH TRANSPARENT PANEL

(71) Applicant: WHIRLPOOL CORPORATION, Benton Harbor, MI (US)

(72) Inventor: Frederick A. Millett, Grand Haven, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,050

(22) Filed: Dec. 13, 2019

(65) Prior Publication Data

US 2020/0120766 A1 Apr. 16, 2020

Related U.S. Application Data

(63) Continuation of application No. 15/553,005, filed as application No. PCT/US2015/019391 on Mar. 9, 2015, now Pat. No. 10,531,524.

(51) Int. Cl.
*H05B 6/76* (2006.01)
*H05B 6/64* (2006.01)
(Continued)

(52) U.S. Cl.
CPC ............ *H05B 6/666* (2013.01); *H05B 6/766* (2013.01)

(58) Field of Classification Search
CPC ................................ H05B 6/766; H05B 6/666
USPC ....... 219/702, 720, 723, 728, 740, 744, 756, 219/757; 341/23, 33, 22; 204/192.29, 204/192.22, 192.23
See application file for complete search history.

(56) References Cited

U.S. PATENT DOCUMENTS 5,180,476 A * 1/1993 Ishibashi ............... C23C 14/086 204/192.29
6,468,403 B1 10/2002 Shimizu
(Continued)

FOREIGN PATENT DOCUMENTS

EP 0226151 A1 6/1989
JP 2953078 A 10/1992
WO 2007046085 A2 4/2007

OTHER PUBLICATIONS

International Search Report and Written Opinion of the International Searching Authority for Counterpart PCT/US2015/019391, dated Nov. 23, 2015a.

*Primary Examiner* — Quang T Van
(74) *Attorney, Agent, or Firm* — McGarry Bair PC

(57) ABSTRACT

A microwave oven includes a cooking cavity having an opening, a source of microwave radiation that transmits microwaves into the cooking cavity, a door positioned adjacent the opening and movable between an open position where the cooking cavity can be accessed through the opening and a closed position where the cooking cavity is inaccessible through the opening. The door further includes a transparent glass panel where the cooking cavity is viewable through the door when the door is in the closed position. The transparent glass panel has at least one surface with a measurable resistance across its surface. The microwave oven further has a circuit connected to the transparent glass panel that measures the sheet resistance of the transparent glass panel.

13 Claims, 3 Drawing Sheets

(51) Int. Cl.

| | |
|---|---|
| ***C03C 17/22*** | (2006.01) |
| ***H05B 6/66*** | (2006.01) |

(56) References Cited

U.S. PATENT DOCUMENTS

| | | | | |
|---|---|---|---|---|
| 10,531,524 | B2 * | 1/2020 | Millett .................... | H05B 6/666 |
| 2009/0008386 | A1 | 1/2009 | Louie et al. | |
| 2009/0008387 | A1 | 1/2009 | Boxman et al. | |

* cited by examiner

MICROWAVE OVEN HAVING DOOR WITH TRANSPARENT PANEL

CROSS-REFERENCE TO RELATED APPLICATIONS

This application is a continuation application of U.S. patent application Ser. No. 15/553,005 filed on Aug. 23, 2017, now U.S. Pat. No. 10,531,524, issued Jan. 7, 2020, which claims priority from International Application No. PCT/US2015/019391 filed Mar. 9, 2015, both of which are incorporated herein by reference in its entirety.

BACKGROUND

A conventional microwave oven cooks food by a process of dielectric heating in which a high-frequency alternating electromagnetic field is distributed throughout an enclosed cavity. A sub-band of the radio frequency spectrum, microwave frequencies at or around 2.45 GHz, cause dielectric heating primarily by absorption of energy in water.

To generate microwave frequency radiation in a conventional microwave, a voltage applied to a high-voltage transformer results in a high-voltage power that is applied to a magnetron that generates microwave frequency radiation. The microwaves are then transmitted to the enclosed cavity containing the food through a waveguide. Standards, such as set by the Food and Drug Administration (FDA), limit the amount of microwave radiation that can leak from an oven throughout its lifetime. Consequently, the door of a microwave oven must limit the transmission of microwave radiation from the enclosed cavity to the surrounding environment. The standard also requires microwave ovens to have two independent interlock systems that stop the production of microwaves the moment the door is opened. Additionally, the door must be aesthetically pleasing and provide a viewing window to permit the visual inspection of the enclosed cavity and the food contained therein. Typically, a perforated metallic shield disposed in or adjacent to a viewing window bars the transmission of microwave radiation through the window.

BRIEF SUMMARY

In one aspect, the invention relates to a microwave oven that has a cooking cavity having an opening, a source of microwave radiation that transmits microwaves into the cooking cavity, and a door that positioned adjacent the opening and movable between an open position where the cooking cavity can be accessed through the opening and closed position where the cooking cavity is inaccessible through the opening. The transparent glass panel has at least one surface with a measurable resistance across its surface. The microwave oven further has a circuit connected to the transparent glass panel that measures the sheet resistance of the transparent glass panel.

DETAILED DESCRIPTION

Figure 1:
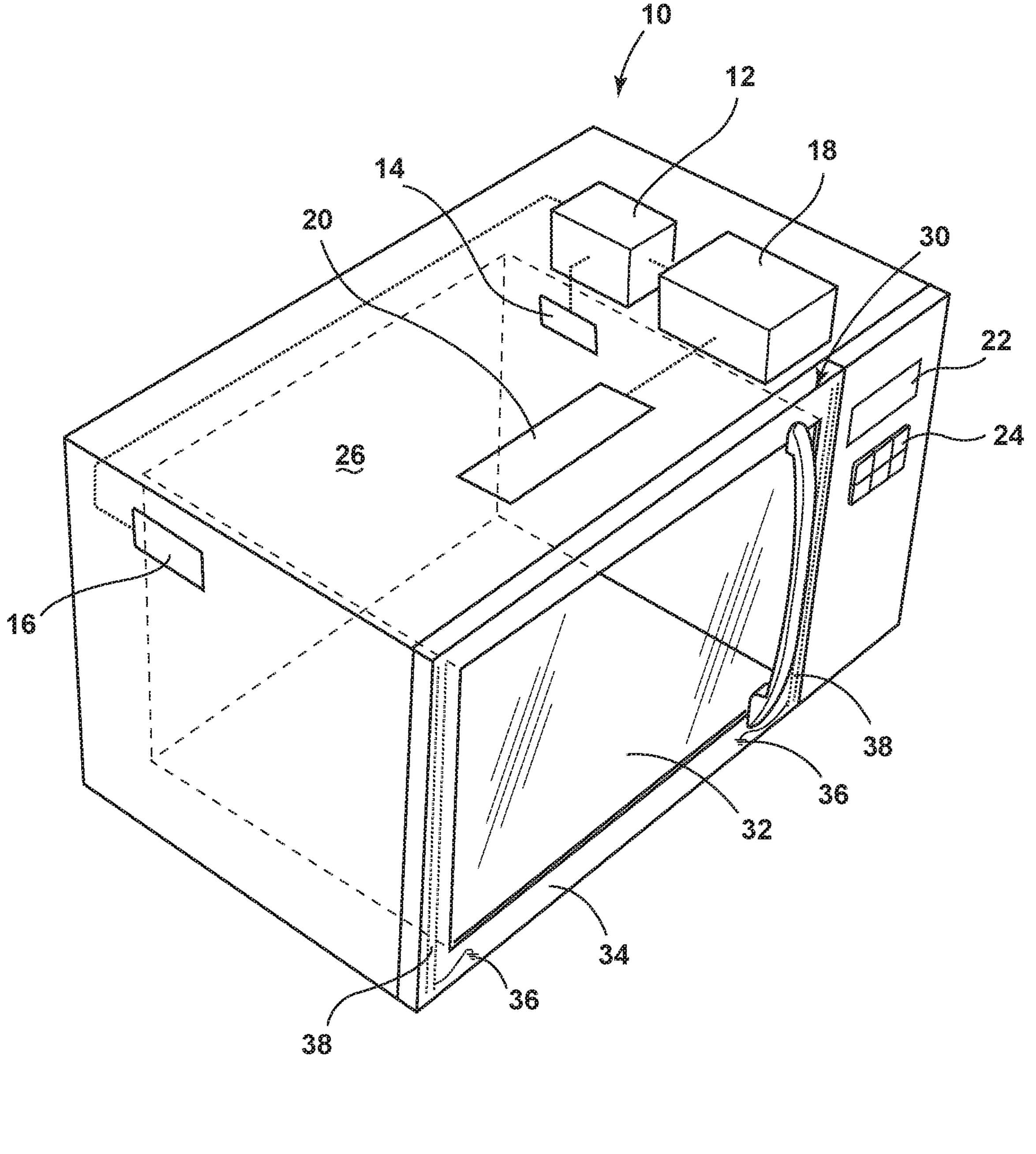
FIG. 1 is a perspective view of a microwave oven according to an embodiment of the invention.

FIG. 1 is a general view of a microwave oven 10 which has features and functions according to the present invention. The microwave oven 10 includes a cooking cavity 26, generally shaped as a rectangular prism defined by a plurality of enclosing surfaces. One of the sides of the cooking cavity 26 has an opening to enable the conveyance of a load (e.g. foodstuff and/or liquids) into or out of the cooking cavity 26 from the surrounding environment. The opening of the cooking cavity 26 is selectively covered by a door 30. The cooking cavity 26 is provided with one or more feeding ports 14, 16 (in the shown example, two), through which microwaves are transmitted to the cooking cavity 26.

As shown in FIG. 1, the cooking cavity 26 includes rectangular enclosing surfaces such that the cooking cavity 26 is defined by a height, width and depth. However, the cooking cavity 26 of the microwave oven 10 is not limited to such a configuration. For example, the cooking cavity 26 may include a circular or semi-circular cross section or may be a composite of multiple geometric configurations, depending upon the implementation.

The door 30 is positioned adjacent the opening of the cooking cavity 26 and is movable between an open position where the cooking cavity 26 can be accessed through the opening and a closed position where the cooking cavity 26 is inaccessible through the opening. The door 30 is provided with at least one transparent glass panel 32 encompassed by a choke frame 34 where the cooking cavity 26 is viewable through the door 30 through a transparent glass panel 32 when the door 30 is in the closed position. As discussed below, the transparent glass panel 32 is constructed to be optically transparent but not transparent to microwaves.

A hinge (not shown) mounted to one side of the door 30 and to a cabinet surrounding the cooking cavity 26 pivotally connects the door 30 to the cabinet. The hinge allows the door 30 to pivotally move between the open position and the closed position. When the door 30 is in the closed position, the choke frame 34 is in communication with a perimeter of the cooking cavity encompassing its opening in such a manner so as to attenuate microwave transmission from the cooking cavity 26 to the surrounding environment via the perimeter of the door 30.

The microwave oven 10 includes a source of microwave radiation 12 connected to the feeding ports 14, 16. The feeding ports 14, 16 may be arranged on any aspect of the enclosing surface of the cooking cavity 26. The connection between the source of microwave radiation 12 and the feeding ports 14, 16 includes a feeding structure to guide microwaves transmitted from the source of microwave radiation 12 to the feeding ports 14, 16 such that the microwaves are transmitted into the cooking cavity 26. The feeding structure may include one or more transmission lines, any of which may further branch from the principle feeding structure to guide microwaves from the source of microwave radiation 12 to the feeding port(s) 14, 16. The transmission line may be a waveguide, a coaxial cable or a strip line. Arrangements for the feeding ports 14, 16 may include regular waveguides, E-probes, H-loops, helices, patch antennas, etc.

The source of microwave radiation 12 may include a magnetron or a solid-state based microwave generator. A solid-state based microwave generator may further include, for example, silicon carbide (SiC) or gallium nitride (GaN) components. Other electronic components may also be configured to constitute the source of microwave radiation 12 depending upon the implementation.

The frequencies of microwaves transmitted by the source of microwave radiation 12 may include a narrow range of frequencies such as 2.4 GHz to 2.5 GHz. It is contemplated that the source of microwave radiation 12 may be configured to transmit other frequencies. For example, the bandwidth of frequencies between 2.4 GHz and 2.5 GHz is one of several bands that make up the industrial, scientific and medical (ISM) radio bands. Therefore in some embodiments, by way of non-limiting examples, the source of microwave radiation 12 may transmit microwaves contained in the ISM bands defined by the frequencies: 13.553 MHz to 13.567 MHz, 26.957 MHz to 27.283 MHz, 902 MHz to 928 MHz, 5.725 GHz to 5.875 GHz and 24 GHz to 24.250 GHz.

The microwave oven 10 may include one or more additional heat sources 20, such as a grill element or a heating source based on force convection. The additional heat source 20 provides an additional source of heating and enhances the cooking capability of the microwave oven 10. The grill element may be arranged in the ceiling of the cavity 26 though other locations may be implemented depending upon the considerations and goals of the additional heat source 20 with respect to a cooking process. The grill element may be, for example, a grill tube, a quartz tube, a halogen-radiation source or an infrared-radiating heater.

The microwave oven 10 may be provided with a user interface that includes one or more input elements 24 such as push buttons, touch switches and knobs etc. for setting operation parameters for controlling the operation of the microwave oven 10. For example, a user may set a cooking function and a length of a heating cycle by manipulation of the input elements 24. Additionally, the user interface may include one or more display elements 22 for displaying information to a user such as information regarding an ongoing heating cycle. While shown as distinct elements in FIG. 1 the input elements 24 and the display elements 22 may spatially overlap depending upon the implementation of the user interface.

The microwave oven 10 includes a control unit 18 for controlling operation of the source of microwave radiation 12 and the additional heating source 20. Based on a food category, a cooking program or other user-initiated instruction via the input elements 24 of the user interface, the control unit instantiates and executes a cycle of operation for heating foodstuff in the cooking cavity 26.

As a result of an initiated cycle of operation, the cooking cavity 26 experiences an increase in heat from both the dielectric heating of the foodstuff by the microwave radiation and the additional thermal radiation provided by the additional heat source 20. Consequently, the door 30 of the microwave oven 10 must attenuate the microwave radiation contained within the cooking cavity 26 as well as contain the thermal radiation resulting from both the microwave cooking process and that supplied by the additional heating source 20. Concurrently, the door 30 includes a transparent glass panel 32 to provide a viewable window into the cooking cavity 26.

Therefore, to attenuate microwave radiation, provide a radiant heat barrier and enable a user to readily view the cooking cavity 26, the door 30 of the microwave oven 10 includes an electrically conductive coated transparent glass panel 32. The electrically conductive glass panel 32 acts as a Faraday cage shield for the viewable window of the microwave oven door 30, while also providing a radiant heat barrier for the combination of the conventional cooking and microwave heating elements. A combination of metal coatings on glass, when grounded to chassis ground 36, effectively shields and reflects microwaves back into the cooking cavity of the microwave oven while providing clear visibility into the cooking cavity.

A Faraday cage is an enclosure, all of whose external surfaces are electrically conducting. For maximum attenuation, the electrically conductive glass coating must be conductively connected to the window frame all around its periphery, which in turn should be connected to the wall of such enclosure. The formula for shield effectiveness (S.E.) in decibels (dB) is S.E.=20 log $(129/R_S)$ where $R_S$ is sheet resistance measured in ohms per square Ω/□).

Figure 2:
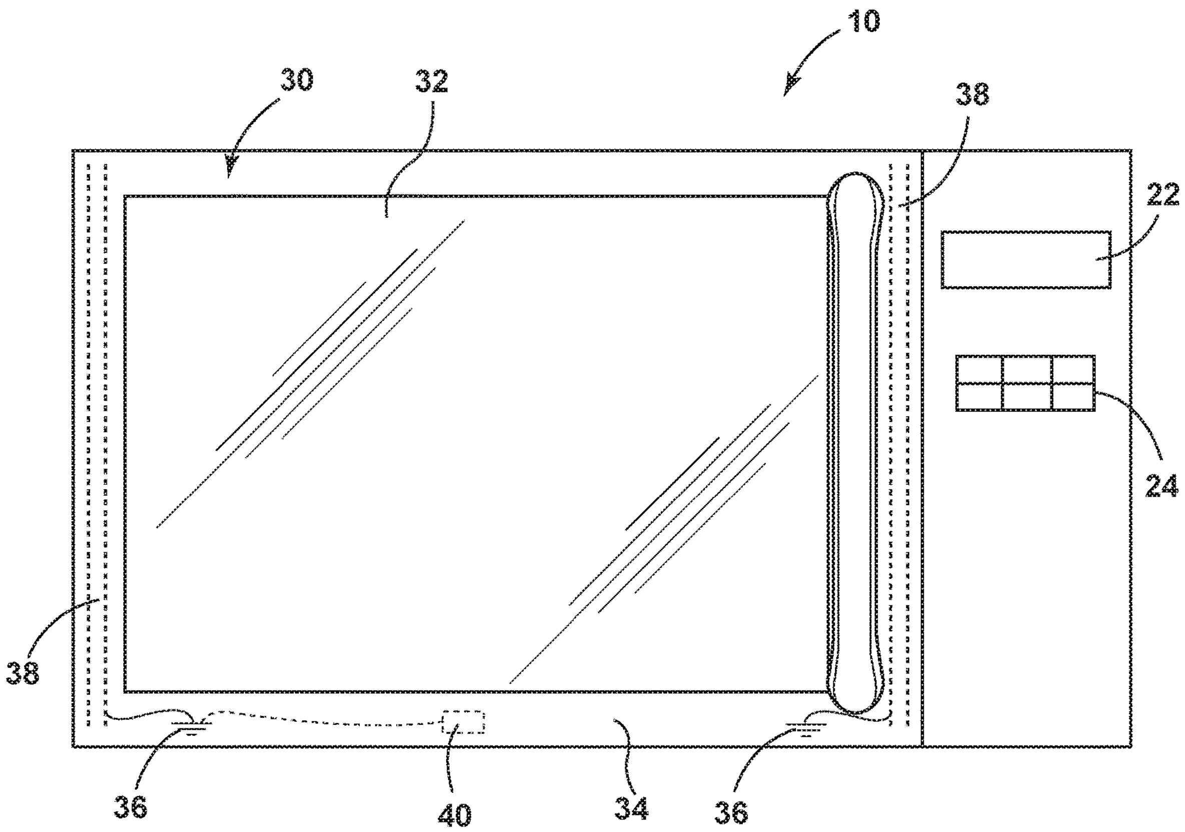
FIG. 2 is a front elevation view of a microwave oven superimposed with a schematic representation of a circuit for measuring sheet resistance according to an embodiment of the invention.

Referring now to FIG. 2, a circuit 40 is connected to the transparent coating that measures the sheet resistance of the transparent coating. The circuit 40 includes at least two electrical connections (e.g. wires, traces, busbars etc.) coupled to the electrically conductive coating at points spaced from each other and the circuit 40 is responsive to the resistance between the two points. For example, the connections may include flat strip busbars 38 spaced across the area of the coating. An electrical resistance lies between the busbars 38 corresponding to the sheet resistance of the electrically conductive coating. The circuit 40 may monitor the resistance levels, and if the transparent glass panel 32 cracks or otherwise breaks, the conductive electrical coating similarly fails causing a change in resistance. Consequently, the circuit 40 measures a change in the measured resistance over a predetermined threshold that will cause the circuit to generate a signal that will terminate power to the source of microwave radiation. For example, the circuit 40 may transmit a signal to the control unit upon detecting a large increase in resistance (e.g. from an approximate short to an approximate open circuit) and the control unit may de-energize the source of microwave radiation and turn off the power feeding the alternative heat source. The circuit 40 may be in series with or parallel with the transparent coating, depending upon the implementation. It is contemplated that the circuit may be directly integrated into the control unit though it may include one or more electrical elements located apart from the control unit such as inside the door.

Figure 3:
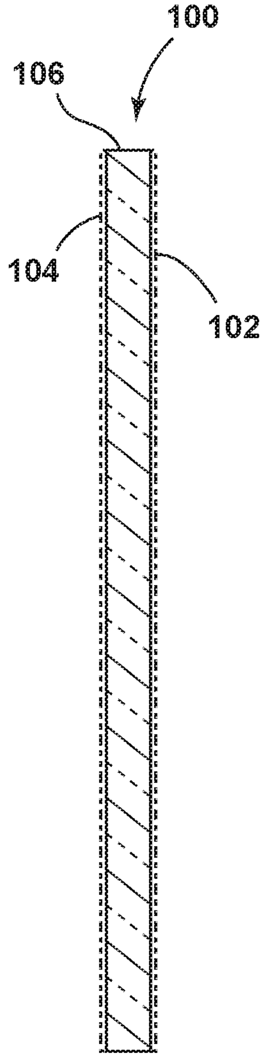
FIG. 3 is a cross section view of a transparent panel of a microwave oven door according to an embodiment of the invention.

Referring now to FIG. 3, a cross-section of the transparent glass panel 100 with conductive metal transparent coatings 102, 104 is shown. The conductive metal transparent coatings 102, 104 may be any form of conductive metal applied to a surface of the transparent glass pane 106 and is on two opposing surfaces of the transparent glass panel 100. For example, the conductive metal transparent coatings 102, 104 may include silver, fluorine doped tin oxide, indium doped tin oxide, gold, copper, fluorine doped zinc oxide or indium doped zinc oxide. The thickness of the coating would be selected maintain light transmission through the transparent glass panel 100 at a high level. Low emissivity coatings like silver and tin oxide may be applied to the glass panes such that each surface of glass 106 is coated on both sides.

The conductive metal coatings 102, 104 applied to the glass pane 106 may include a hard coat, low emissivity coating and have a sheet resistance in the range of 10 to 25Ω/□. The coatings 102, 104 applied to the glass pane 106 may include silver coatings with a sheet resistance in the range of 2 to 5Ω/□. For a hard-coated fluorine-doped tin oxide of 10Ω/□, the shielding effectiveness for the transparent panel 100 is approximately 22 dB. For context, a 20 dB S.E. results in approximately a 90% attenuation of the electric field through the transparent glass panel 100. It is contemplated that the sheet resistance of a coating may preferably range from 1 to 50Ω/□. The contact with the conductive coating on the glass can be by solder, silver paste, conductive epoxy, copper tape with conductive adhesive or other conductive metal with conductive adhesive. All glass panes are preferably constructed of tempered glass.

Lower sheet resistance will increase the shielding effectiveness, and is only limited by the desired transparency of the conductive coatings 102, 104 and the overall aesthetic visual appearance provided by the transparent glass panel 100. As shown, the transparent glass panel 100 may include coatings placed on both sides of the tempered glass pane 106. In one example, a transparent glass panel 100 may include a pyrolytic fluorine doped tin oxide coating combined with sputtered silver with anti-reflective layers for color suppression and include a coating with 3 Ω/□ sheet resistance (resulting in a S.E. of 32 dB). The transparent glass panel 100 may include the combination of coatings on both sides of the glass pane 106 to further increase the S.E.

Figure 4:
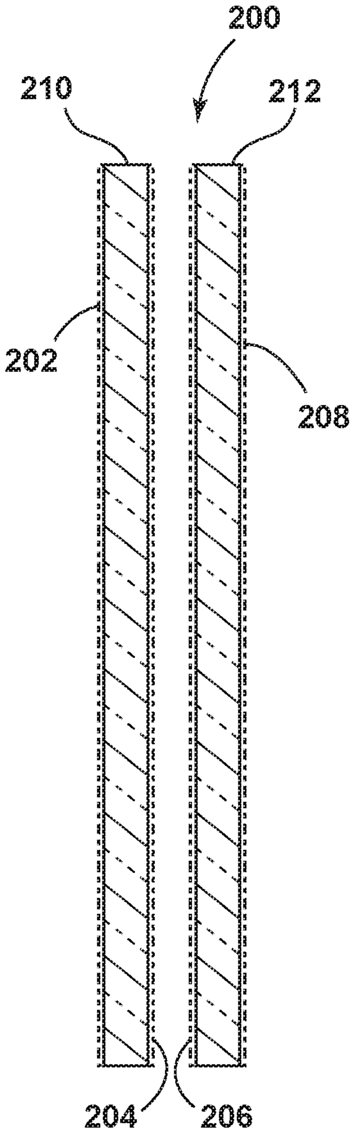
FIG. 4 is an alternative cross section view of a transparent panel of a microwave oven door according to an embodiment of the invention.

Referring now to FIG. 4, other implementations may include a microwave oven door 200 with two transparent glass panels 210, 212, of double side coated glass. That is each glass panel 210 and 212 includes at least one coating 202, 204, 206, 208. The glass panels 210, 212 may be placed in contact or separated by an airgap depending upon the implementation.

Other implementations include a transparent glass panel for a microwave oven door with one pane of double sided coated glass and one pane of single sided coated glass depending on the desired level of shielding for the microwave radiation. For example, the microwave oven door 200 may include two transparent glass panels 210, 212 wherein the conductive metal transparent coating 202, 204, 206 is on three of the surfaces of the two transparent glass panels 210, 212. In this way, the type of coating and number of sides of electrically conductive coated glass may be selected based on a desired performance with respect to attenuating microwave leakage.

The above-described transparent glass panels with the metal coatings, in the case of a microwave oven combined with a conventional radiant or convection heating element include heat reflective properties as well as microwave shielding. That is, the above-described embodiments satisfy the electromagnetic and thermal leakage restrictions required of a microwave oven door as well as providing a viewable window into the cooking cavity. In contrast to conventional microwave oven doors that include a foraminous or perforated metal plate or metallization aligned with a glass panel, the above-described embodiments enable a viewable window in a microwave oven door that is transparent over the entire spatial extent of the window. That is, the transparent glass panel is optically transparent across the entire viewable window as opposed to a perforated pattern of optically transparent dots arrayed on an opaque surface or vice-versa (i.e. a perforated pattern of opaque dots arrayed on an optically transparent surface).

While the invention has been specifically described in connection with certain specific embodiments thereof, it is to be understood that this is by way of illustration and not of limitation, and the scope of the appended claims should be construed as broadly as the prior art will permit.

The invention claimed is:

1. A microwave oven comprising:

a cooking cavity with an opening;

a source of microwave radiation that transmits microwaves into the cooking cavity;

a door positioned adjacent the opening and movable between an open position where the cooking cavity can be accessed through the opening and a closed position where the cooking cavity is inaccessible through the opening, the door further having a transparent glass panel where the cooking cavity is viewable through the door when the door is in the closed position; wherein the transparent glass panel has at least one surface with a measurable resistance across its surface;

a circuit connected to the transparent glass panel that measures the sheet resistance of the transparent glass panel.

2. The microwave oven according to claim 1 further comprising a conductive coating on at least one surface of the transparent glass panel that attenuates microwave transmission from the cooking cavity through the door wherein the conductive metal transparent coating has a sheet resistance and is electrically grounded.

3. The microwave oven according to claim 2, wherein the conductive coating is a transparent metal.

4. The microwave oven according to claim 2 wherein the conductive coating is at least one of silver, fluorine doped tin oxide, indium doped tin oxide, gold, copper, fluorine doped zinc oxide or indium doped zinc oxide.

5. The microwave oven according to claim 1 wherein the sheet resistance is in a range of 1-50 ohms per square.

6. The microwave oven according to claim 2 wherein the conductive coating is on two opposing surfaces of the transparent glass panel.

7. The microwave oven according to claim 6 wherein the conductive coating on one of the opposing surfaces of the transparent glass panel is fluorine doped tin oxide and the conductive coating on the other of the two opposing surfaces of the glass panel is one of silver, indium tin oxide or doped zinc oxide.

8. The microwave oven according to claim 1 comprises two transparent glass panels.

9. The microwave oven according to claim 8 further comprising a conductive metal transparent coating on three of the surfaces of the two transparent glass panels.

10. The microwave oven according to claim 2 wherein the conductive coating is heat reflective.

11. The microwave oven according to claim 2 wherein the circuit comprises at least two electrical conductors connected to the conductive coating at points spaced from each other, wherein the circuit is responsive to the resistance between the two points.

12. The microwave oven according to claim 2 wherein a change in the measured resistance over a predetermined threshold will cause the circuit to generate a signal to terminate power to the source.

13. The microwave oven according to claim 1 wherein the transparent glass panel comprises tempered glass.

* * * * *